US011162862B2

(12) United States Patent
Landmann et al.

(10) Patent No.: US 11,162,862 B2
(45) Date of Patent: Nov. 2, 2021

(54) SYSTEMS AND METHODS FOR COMPENSATING THE EFFECTS OF ABSOLUTE PRESSURE IN DIFFERENTIAL PRESSURE SENSORS

(71) Applicant: Kulite Semiconductor Products, Inc., Leonia, NJ (US)

(72) Inventors: Wolf S. Landmann, Fair Lawn, NJ (US); Louis DeRosa, Saddle River, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 270 days.

(21) Appl. No.: 16/429,623

(22) Filed: Jun. 3, 2019

(65) Prior Publication Data
US 2020/0378853 A1     Dec. 3, 2020

(51) Int. Cl.
| G01L 13/00 | (2006.01) |
| G01L 27/00 | (2006.01) |
| G01L 1/22 | (2006.01) |
| G01L 9/02 | (2006.01) |
| G01L 19/06 | (2006.01) |
| G01L 9/00 | (2006.01) |
| G01L 13/02 | (2006.01) |

(52) U.S. Cl.
CPC .............. *G01L 19/06* (2013.01); *G01L 1/225* (2013.01); *G01L 1/2262* (2013.01); *G01L 1/2268* (2013.01); *G01L 9/0051* (2013.01); *G01L 13/025* (2013.01); *G01L 27/002* (2013.01)

(58) Field of Classification Search
CPC ....... G01L 19/02; G01L 19/04; G01L 9/0051; G01L 9/0052; G01L 9/0054; G01L 9/0055; G01L 9/0057; G01L 2009/0066; G01L 13/025; G01L 13/026; G01L 27/00; G01L 27/002; G01L 27/005; G01L 1/20; G01L 1/205; G01L 1/22; G01L 1/225; G01L 1/2256; G01L 1/2262; G01L 1/2268; G01L 1/2275; G01L 1/2281; G01L 1/2287; G01L 1/2293
See application file for complete search history.

(56) References Cited

U.S. PATENT DOCUMENTS

| 5,144,843 A | * | 9/1992 | Tamura | ................. G01L 9/0042 338/4 |
| 2005/0081637 A1 | * | 4/2005 | Kurtz | ........................ G01L 9/06 73/715 |
| 2006/0201255 A1 | * | 9/2006 | Czarnocki | ............... G01L 19/02 73/720 |

* cited by examiner

*Primary Examiner* — Herbert K Roberts
(74) *Attorney, Agent, or Firm* — Troutman Pepper Hamilton Sanders LLP; James E. Schutz; Mark Lehi Jones

(57) ABSTRACT

A pressure transducer is disclosed that includes an absolute pressure sensor assembly, a differential pressure sensor assembly, a main pressure port in communication with the absolute pressure sensor assembly and the differential pressure sensor assembly, a reference pressure port in communication with the differential pressure sensor assembly, and a compensation circuit in communication with the absolute pressure sensor assembly and the differential pressure sensor assembly. The compensation circuit is configured to reduce an error in an output of the differential pressure sensor assembly (due to absolute pressure) by at least a portion of an output received from the absolute pressure sensor assembly.

18 Claims, 7 Drawing Sheets

SYSTEMS AND METHODS FOR COMPENSATING THE EFFECTS OF ABSOLUTE PRESSURE IN DIFFERENTIAL PRESSURE SENSORS

FIELD

The disclosed technology relates to differential pressure sensors, and more particularly to compensation techniques to improve the measurement accuracy thereof.

BACKGROUND

A differential pressure sensor is a device that produces an output signal indicative of a difference between pressures applied to two pressure ports. A typical differential pressure sensor utilizes piezoresistive components that are mounted on a diaphragm to produce an output signal responsive to a deflection of the diaphragm.

In certain applications, the differential pressure sensor is intended to measure a relatively small differential pressure that may exist between the two pressure ports, while the absolute pressure at either port may be relatively high. For example, a pressure sensor may be used to measure differential pressure of approximately 3 PSI between two ports, where the first port is subjected to an absolute pressure of approximately 502 PSI, while the second port is subject to an absolute pressure of approximately 499 PSI.

Known types of differential pressure sensors can be susceptible to distortions caused by the significant absolute pressures at the ports. A need exists for systems and methods that can reduce or eliminate such effects.

BRIEF SUMMARY

The various embodiments of the disclosed technology include systems and methods for compensating the effects of absolute pressure in differential pressure sensors.

A pressure transducer is disclosed that includes an absolute pressure sensor assembly, a differential pressure sensor assembly, a main pressure port in communication with a first input of the absolute pressure sensor assembly and a first input of the differential pressure sensor assembly, a reference pressure port in communication with a second input of the differential pressure sensor assembly. and a compensation circuit in communication with the absolute pressure sensor assembly and the differential pressure sensor assembly. The compensation circuit is configured to reduce an error in an output of the differential pressure sensor assembly by at least a portion of an output of the absolute pressure sensor assembly.

A method is provided for compensating differential pressure measurement error in a pressure transducer due to absolute pressure, according to certain example implementations of the disclosed technology. The method can include providing a pressure transducer having an absolute pressure sensor assembly, a differential pressure sensor assembly, and a compensation circuit in communication with the absolute pressure sensor assembly and the differential pressure sensor assembly. The method includes receiving, with the absolute pressure sensor assembly and the differential pressure assembly via a main pressure port, an absolute pressure. The method includes receiving, with the differential pressure sensor assembly via a reference pressure port, a reference pressure. The method includes outputting, with the compensation circuit, a compensated signal, the compensated signal comprising an output of the differential pressure sensor assembly modified by at least a portion of an output of the absolute pressure sensor assembly.

The various embodiments described herein may enable compensating effects of absolute pressure in differential pressure measurements.

DETAILED DESCRIPTION

Figure 1:
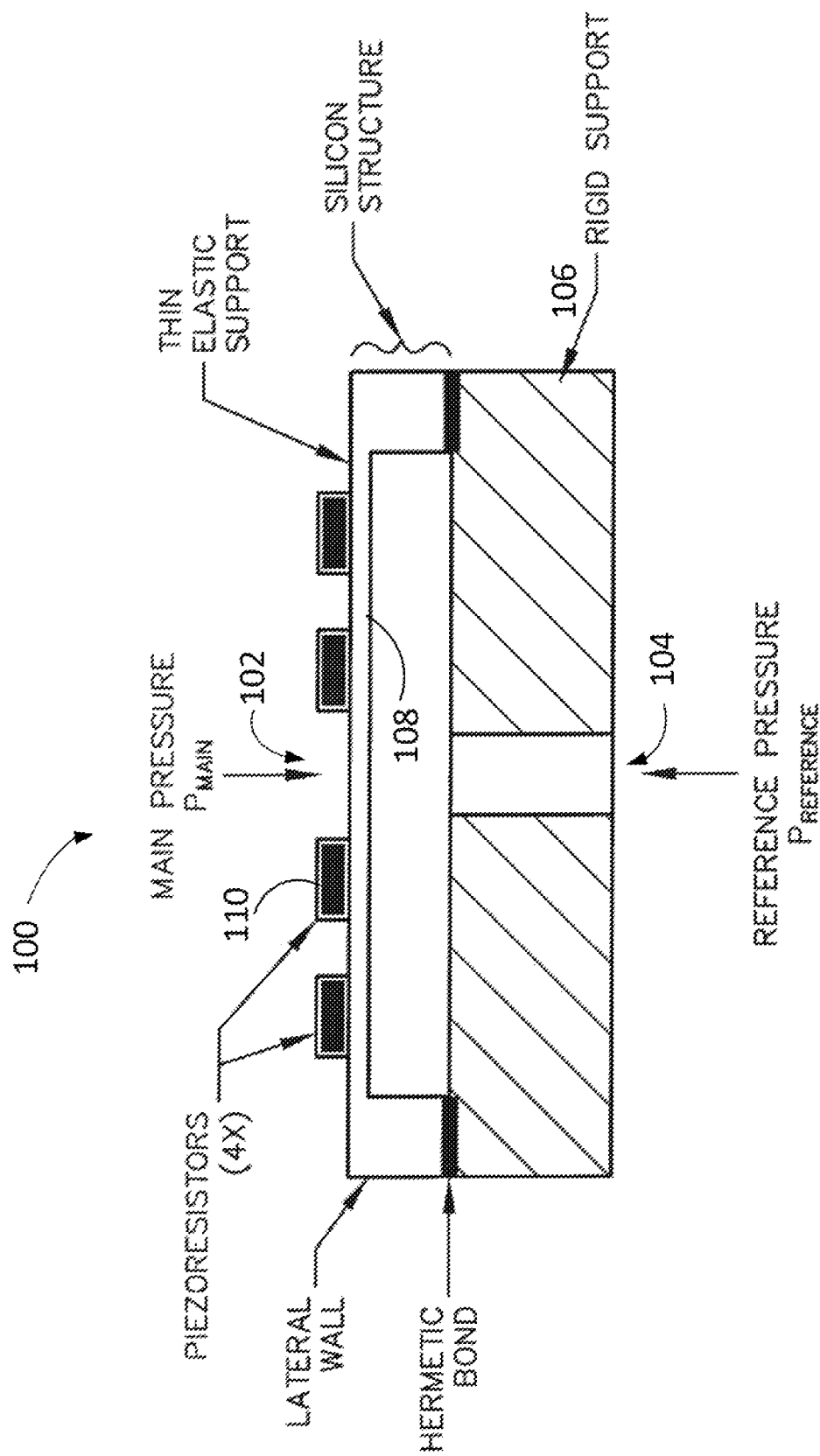
FIG. 1 illustrates a typical differential pressure sensor 100.

Referring now to the drawings, in which like numerals represent like elements, exemplary embodiments of the disclosed technology are herein described. It is to be understood that the figures and descriptions of the disclosed technology have been simplified to illustrate elements that are relevant for a clear understanding of the disclosed technology, while eliminating, for purposes of clarity, many other elements found in typical pressure transducer assemblies and methods of making and using the same. Those having ordinary skill in the art will recognize that other elements are desirable and/or required in order to implement the disclosed technology. However, because such elements are well known in the art, and because they do not facilitate a better understanding of the disclosed technology, a discussion of such elements is not provided herein.

FIG. 1 depicts a typical differential pressure sensor 100 that includes a main port 102 for receiving a main pressure $P_{MAIN}$, and a reference port 104 for receiving a reference pressure $P_{REFERENCE}$. The configuration shown in FIG. 1 can be used in applications where the absolute values of the main and reference pressures are much higher than the differential pressure (for example, $|P_{MAIN} - P_{REFERENCE}|$) intended to be measured.

As depicted in FIG. 1, the typical differential pressure sensor 100 can include a support structure 106 (such as a header) for supporting a flexible diaphragm region 108 to which piezo sensitive components 110 can be attached. For example, four piezoresistors may be embedded in a silicon monocrystalline planar support structure and electrically connected to form a Wheatstone bridge. As the main and reference pressures are applied to the respective ports 102, 104 and when the Wheatstone bridge is supplied with a constant voltage, the Wheatstone bridge may produce an output voltage that is proportional to the differential pressure, i.e.:

$$V_{OUT} = k * P_{DIFF},$$

where:

$$P_{DIFF} = P_{MAIN} - P_{REFERENCE}.$$

While the main and reference pressures can vary over a wide range, an ideal differential sensor should produce an output signal indicative only of the difference between the main and reference pressures. However, as depicted in the graph 200 of FIG. 2, a shortcoming of the typical differential pressure sensor (such as the sensor 100 shown in FIG. 1) is that the output signal 202 (y-axis) as a function of the differential pressure 204 (x-axis) can be affected by the applied absolute values of the main and reference pressures. For example, FIG. 2 exemplifies the response characteristics of a typical differential transducer when the applied differential pressure (PSID) 204 is varied from zero to fifty pounds per square inch. The graph 200 shows different response characteristics due to the different applied absolute reference pressures at zero 206, five thousand 208, and ten thousand 210 pounds per square inch absolute (PSIA). In this example, subjecting the typical differential sensor to equal main and reference pressures of ten-thousand PSIA 210 (with zero differential pressure) can result in sizeable offset error in the output voltage 202 of 20 mV.

Figure 2:
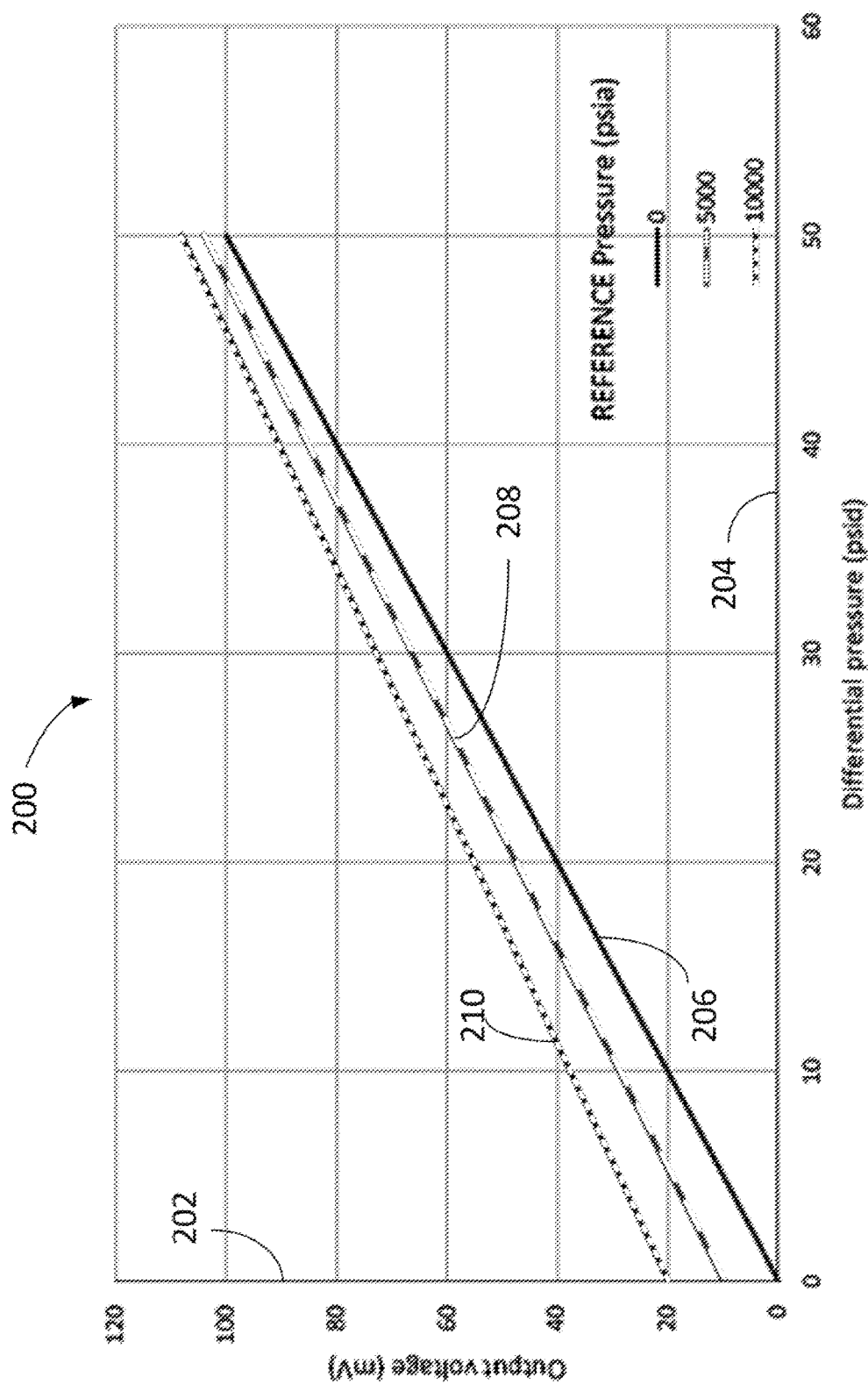
FIG. 2 is a graph 200 illustrating the effects that absolute pressure can have on a typical differential sensor output signal.

Certain errors in the output voltage signal 202 can be attributed to lateral walls of the sensor that may not be perfectly rigid and may flex due to the high absolute pressure. As depicted in FIG. 2, while the output signal 202 may also include certain slope and/or linearity errors, the offset (y-axis intercept) may be the dominant error, particularly for high values of applied absolute pressure.

Figure 3:
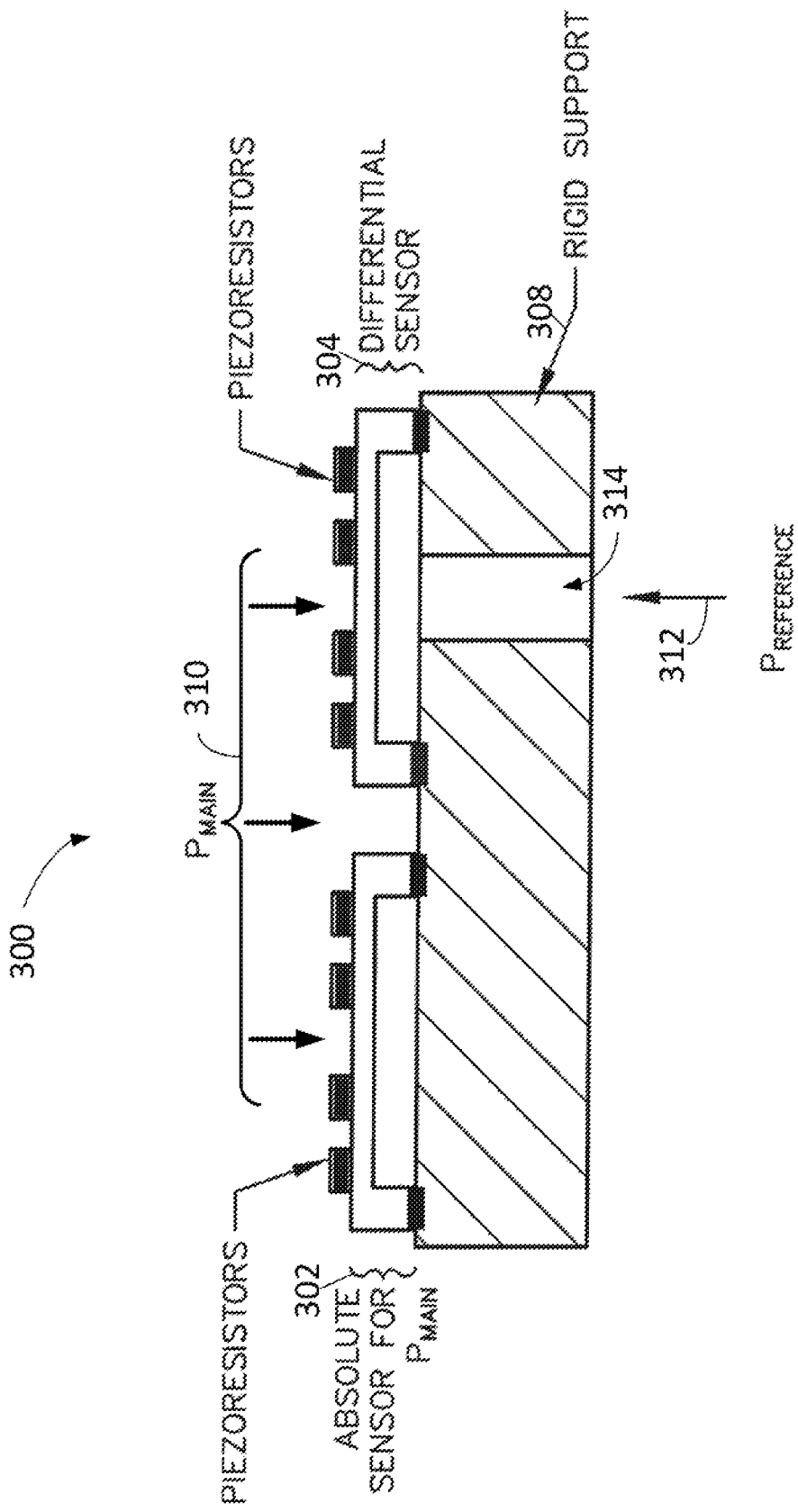
FIG. 3 depicts an arrangement of a dual sensor transducer 300 according to an example implementation of the disclosed technology.

FIG. 3 depicts an arrangement of a dual transducer pressure sensor 300 according to an example implementation of the disclosed technology. The sensor 300 may be configured to reduce or eliminate certain response errors (such as an offset error as discussed above) that can result from applied absolute pressure. In accordance with certain example implementations of the disclosed technology, the sensor 300 can include both an absolute pressure sensor 302 and differential sensor 304 mounted on a rigid support 308. In certain example implementations, and as depicted in FIG. 3, the main pressure $P_{MAIN}$ 310 may be directed to both the absolute pressure sensor 302 and the differential sensor 304 by a main port (not shown) while the reference pressure $P_{REFERENCE}$ 312 may be directed only to the differential sensor 304 via a reference port 314. In certain example implementations, the main pressure $P_{MAIN}$ 310 and the reference pressure $P_{REFERENCE}$ 312 may be directed to opposite sides of a diaphragm of the differential pressure sensor 304. However, the output of differential sensor 304 may include error due to the due to the presence of at least the main pressure $P_{MAIN}$ 310. According to certain example implementations of the disclosed technology, a signal output from the absolute pressure sensor 302 may be utilized to compensate for response errors in the differential sensor 304, as will now be discussed with reference to FIGS. 4-6.

Figure 4:
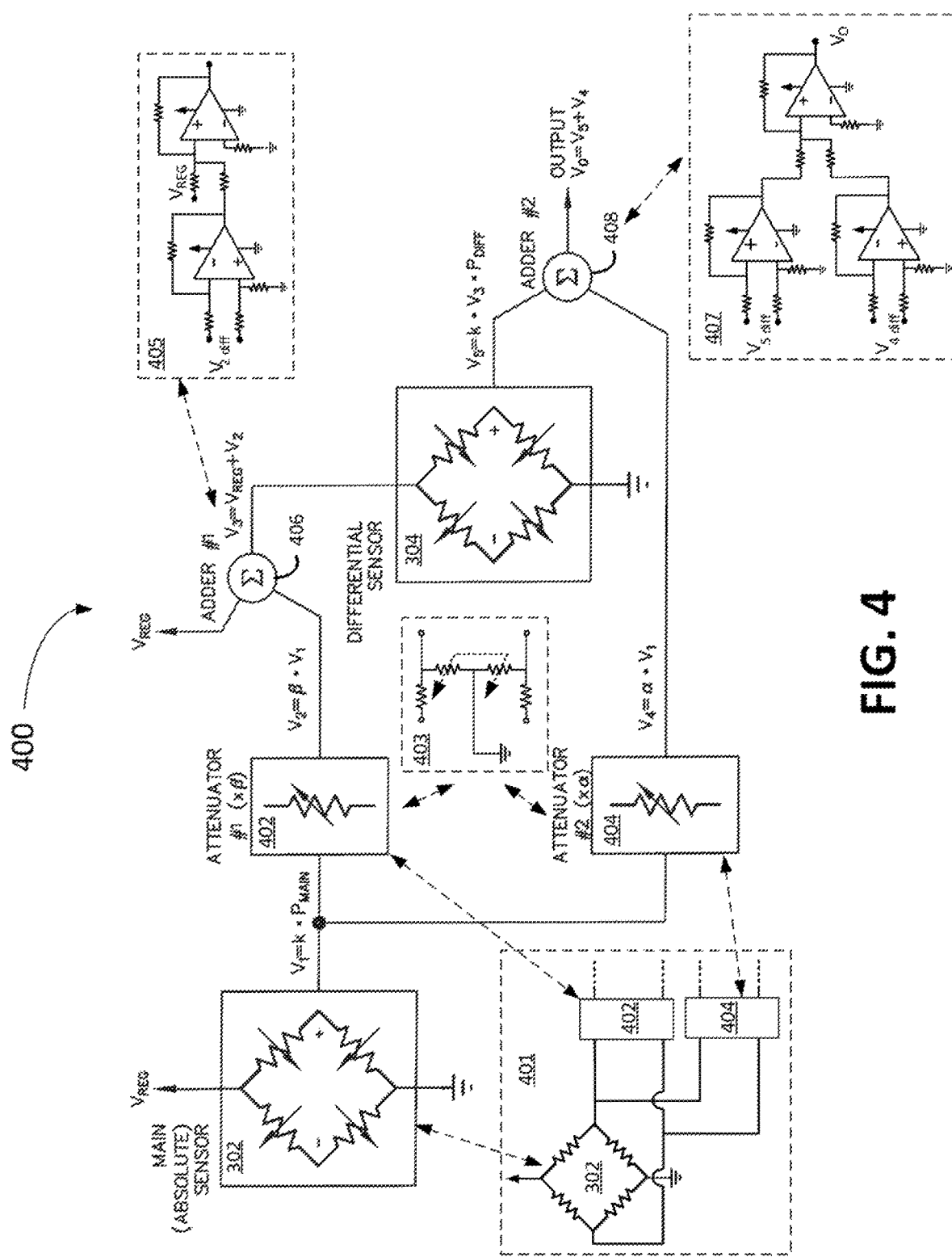
FIG. 4 depicts a block diagram 400 of an example dual sensor transducer with a compensation circuit, according to an example implementation of the disclosed technology.

FIG. 4 is a block diagram representation of an example dual transducer pressure sensor 400 having compensation circuitry that may be utilized with the absolute pressure sensor 302 and the differential sensor 304 to compensate certain response errors, as discussed above. For simplicity, the signal paths in the sensor 400 are represented by single lines. In practice, however, the circuitry may include differential circuit paths and components (and/or a mixture of differential and single-ended circuit paths and components), as depicted in the example inset circuits (dashed line boxes) 401, 403, 405, 407. For example, the attenuators 402, 404 may include differential (dual) voltage dividers referenced to a common ground, as depicted in the inset circuit 403. In certain example implementations, the attenuators 402, 404 may include fixed resistors. In certain example implementations, the attenuators 402, 404 may optionally include variable resistors (i.e., potentiometers) to provide fine tuning. As depicted in the inset circuit 403 (when variable resistors are utilized for the attenuators 402, 404) certain pairs of variable resistors may be optionally ganged with a common control to provide differential attenuation with a single adjustment.

In accordance with certain example implementations of the disclosed technology, one or more of the attenuators 402, 404 may be electronically adjustable. In accordance with certain example implementations of the disclosed technology, one or more of the attenuators 402, 404 may be electronically adjustable the based on a measured output of the absolute pressure sensor 302, as will be discussed further with reference to FIG. 5.

In accordance with certain example implementations of the disclosed technology, the first adder 406 depicted in FIG. 4 may be configured to receive differential input $V_{2\ diff}$ from the (differential) attenuator 402 while also being configured to receive the single-ended regulated voltage $V_{REG}$. For example, the first adder 406 may be configured with a difference amplifier in a first stage, and a summing amplifier in an output stage, as depicted in the inset schematic 405.

In accordance with certain example implementations of the disclosed technology, the second adder 408 depicted in FIG. 4 may be configured to receive differential input $V_{4\ diff}$ from the (differential) second attenuator 404 via a first differential amplifier, while also being configured to receive differential input $V_{5\ diff}$ from the differential sensor 304 via a second differential amplifier, as shown in the inset circuit 407. In certain example implementations, a second stage summing amplifier may be utilized to sum the associated resulting (converted) inputs to produce a single ended output $V_O$, as depicted in the inset circuit 407. As known to those having skill in the electronic arts, numerous alternative passive and/or active circuits with associated configured polarities may be utilized as needed. The example inset circuits 401, 403, 405, 407 (and 503, 508 in FIG. 5) serve as enabling example circuits and are not intended to limit the disclosed technology.

In the circuit 400, if the differential sensor 304 were ideal, it may produce an output that may be represented by: $V_5 = k*V_3*P_{DIFF}$. Assuming a constant supply voltage $V_3$, this output would be proportional only to the differential pressure and would not be affected by the MAIN (absolute) pressure. However, as discussed above, an actual differential pressure sensor 304 may have an output that is also dependent on the MAIN pressure and may be represented by:

$$V_5 = k*V_3*P_{DIFF}*(1+m*P_{MAIN})+n*P_{MAIN}$$

In the above representative equation, m and n may be small factors respectively representing the effects of the MAIN pressure on the slope (scale factor) and offset of the differential output. The respective slope and offset errors $m*P_{MAIN}$ and $n*P_{MAIN}$ may be only a few percent but may be large enough to significantly degrade the accuracy of the sensor. To compensate these effects, and according to certain example implementations, the output $V_1$ of the absolute sensor 302 may be attenuated by the first attenuator 402 and fed to the first adder 406 to produce a bias voltage $V_3$ (referenced to a regulated voltage $V_{REG}$) for energizing the differential sensor 304. In an example implementation, the output $V_1$ of the absolute sensor 302 may also be attenuated by a second attenuator 404 and added to the output of the differential sensor 304 by the second adder 408. The attenuation factor α of the second attenuator 404 and the attenuation factor β of the first attenuator 402 (and their associated polarities) may be configured such that the effects of the MAIN pressure are reduced or eliminated from the output of the second adder 408, as will be further explained below.

In accordance with certain example implementations of the disclosed technology, the output of the absolute sensor 302 may be represented as $V_1=k_1*P_{MAIN}$. In certain example implementations, the output of the first attenuator 402 may be represented as $V_2=\beta*V_1=\beta*k_1*P_{MAIN}$, while the output of the second attenuator 404 may be represented as $V_4=\alpha*V_1=\alpha*k_1*P_{MAIN}$. According to certain example implementations of the disclosed technology, the attenuation factors α and β may be small signed numbers with values chosen such that that the effects of the $P_{MAIN}$ are canceled. In accordance with certain example implementations of the disclosed technology, the output of the first adder 406, which may be utilized as the supply voltage of the differential sensor 304 may be represented as $V_3=V_{REG}+V_2=V_{REG}+\beta*k_1*P_{MAIN}$. Substituting this expression in the above equation for $V_5$ results in the following expressions:

$$V_5 = k*(V_{REG}+\beta*k_1*P_{MAIN})*P_{DIFF}*(1+m*P_{MAIN})+n*P_{MAIN}$$

$$V_5 = k*V_{REG}*\left(1+\frac{\beta*k_1}{V_{REG}}*P_{MAIN}\right)*(1+m*P_{MAIN})*P_{DIFF}+n*P_{MAIN}$$

The output of the second adder 408 may be expressed as:

$$V_O = k*V_{REG}*\left(1+\frac{\beta*k_1}{V_{REG}}*P_{MAIN}\right)*(1+m*P_{MAIN})*P_{DIFF}+$$
$$(n+\alpha*k_1)*P_{MAIN}$$

By choosing the attenuation factors α and β such that:

$$\frac{\beta*k_1}{V_{REG}}=-m$$

and:

$$\alpha*k_1=-n$$

the resulting output voltage $V_O$ may be expressed as:

$$V_O=k*V_{REG}*[1-(m*P_{MAIN})^2]*P_{DIFF}$$

In accordance with certain example implementations of the disclosed technology, the offset effects of the MAIN pressure may be significantly reduced or eliminated, and the scale factor errors may be reduced to second order, which may be small enough to be negligible. In certain cases, the scale factor effects caused by the MAIN pressure may be small enough that only offset errors induced by the MAIN pressure need to be compensated.

Figure 5:
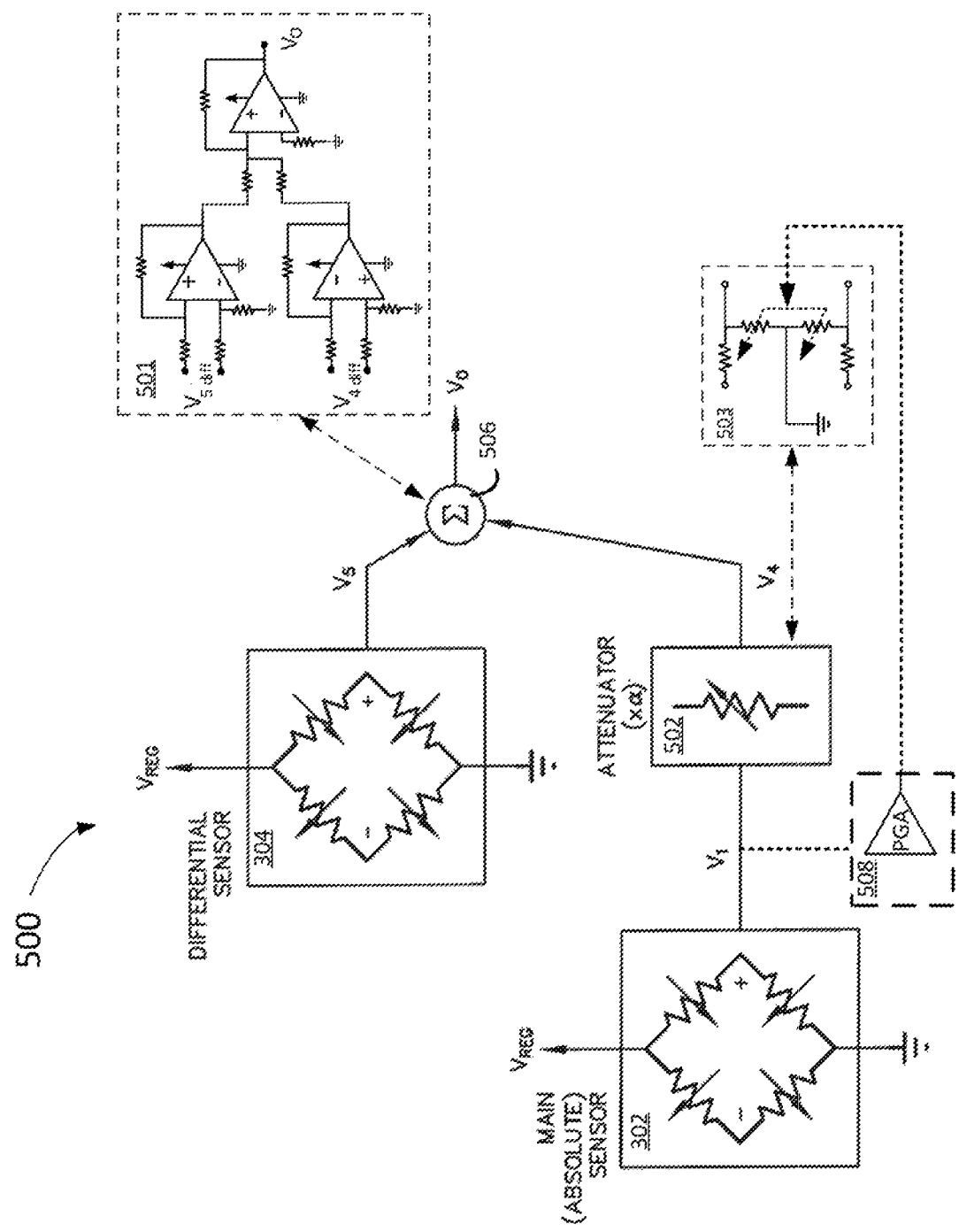
FIG. 5 depicts a block diagram 500 of an example dual sensor transducer with a compensation circuit, according to an example implementation of the disclosed technology.

FIG. 5 depicts a block diagram representation of an example dual transducer pressure sensor 500 having compensation circuitry that may be utilized with the absolute pressure sensor 302 and the differential sensor 304 to compensate certain response errors, as discussed above. In this example compensation circuitry, the output level $V_1$ from the absolute sensor 302 may be adjusted by the attenuator 502 (which may be embodied as a differential attenuator and/or electronically controlled attenuator, as shown in the inset circuit 503) to produce $V_4$. As depicted, and according to certain example implementations, the output $V_5$ from the differential sensor 304 may be summed with output of the attenuator 502 output $V_4$ by an adder 506 to produce the output signal $V_O$. As depicted in the example inset circuit 501, the adder 506 may include differential and summing stages (as discussed above in FIG. 4 with reference to inset circuit 407).

As shown in FIG. 5, and according to certain example implementations, the attenuator 502 may be electronically controllable. For example, an electronically controllable attenuator 503 may be connected to an output of the absolute pressure sensor assembly 302. Certain example implementations can include a controller 508 configured to adjust the electronically controllable attenuator 503 based on a measured output of the absolute pressure sensor assembly 302. Certain example implementations of the controller 508 may include a programmable gain amplifier. In this example implementation, the electronically controllable attenuator 503 may output a signal corresponding to an attenuated portion of the output of the absolute pressure sensor assembly 302 which may be combined/added/subtracted from an output of the differential sensor 304 (via an adder 506, for example) to automatically adjust for errors in an output of the differential sensor 506 due to the presence of absolute pressure. In certain example implementations, the automatic adjustment provided by the controller 508 and the electronically controllable attenuator 503 may be configured to reduce errors in the output of the dual sensor pressure transducer (due to the presence of absolute pressure) over a wide range of values of absolute pressure.

Figure 6:
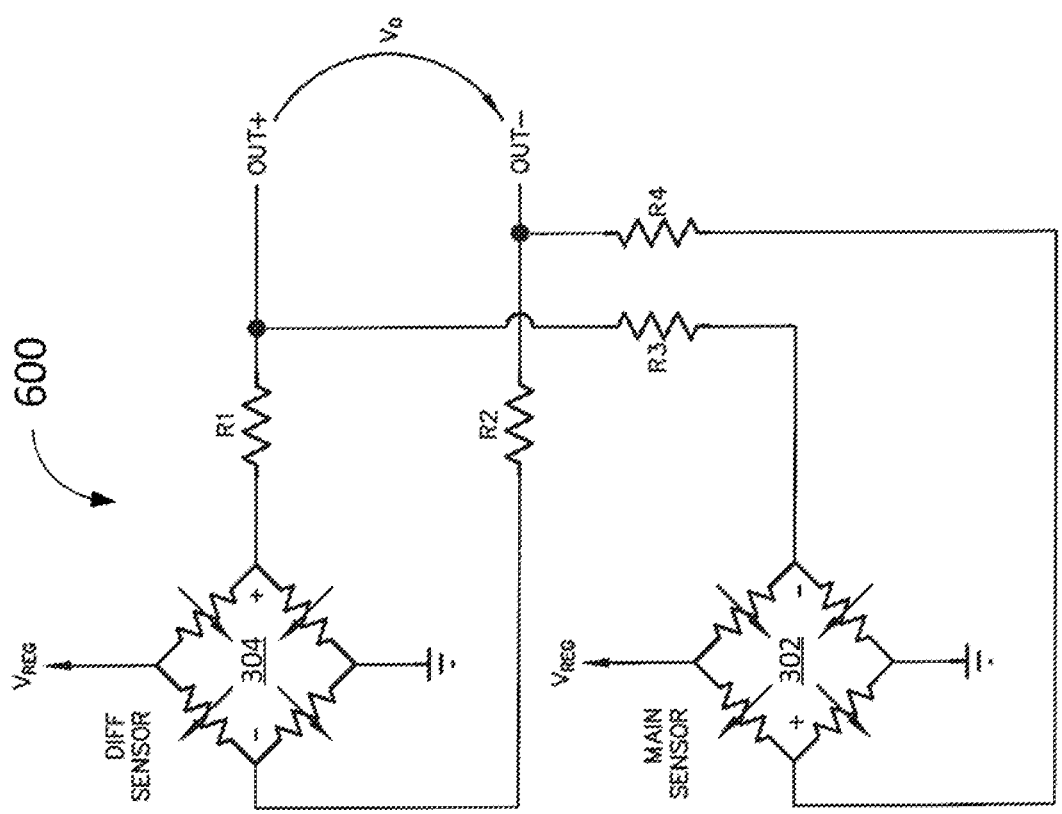
FIG. 6 depicts an example dual sensor transducer 600 with a compensating circuit, according to an example implementation of the disclosed technology.

FIG. 6 depicts another example dual transducer pressure sensor 600 having circuitry that may be utilized to implement compensation using a simplified circuit. In this implementation, the equivalent of the attenuator and adder may be embodied by passive resistors $R_1$, $R_2$, $R_3$, and $R_4$, with $R_1=R_2$, and $R_3=R_4$. In certain example implementations, the attenuation factor α (as discussed above) may be determined by the ratio of the resistors $R_1/R_3$. The example sensor 600 is shown with opposite polarities of the main sensor 302 and the differential sensor 304 connected (via the attenuator/adder resistors) for providing a difference between the output of the differential sensor 304 and the output of the main sensor 302. However, depending on the actual configuration of the Wheatstone bridge, the output polarity of the main sensor 302 or the differential sensor 304 may be reversed.

Figure 7:
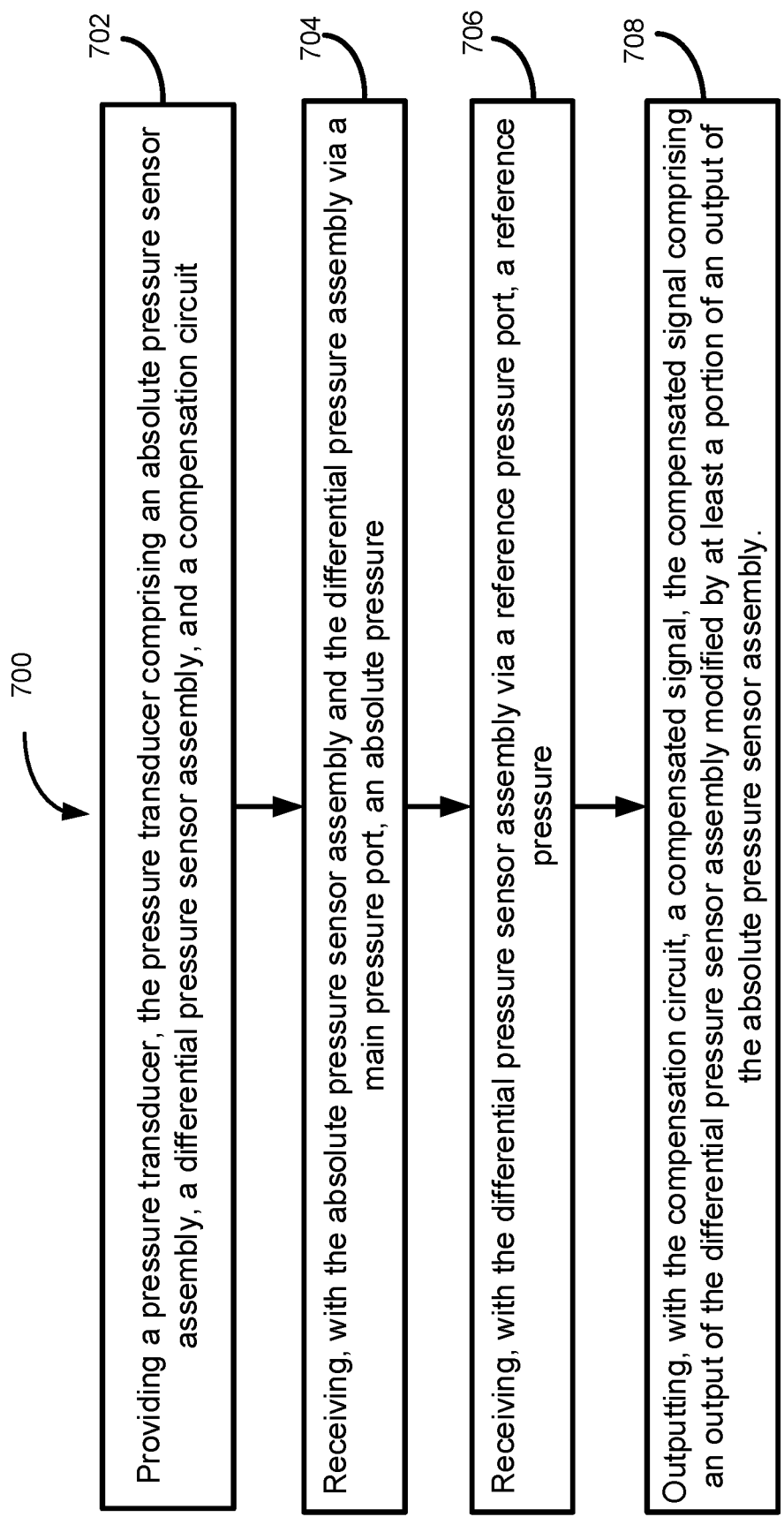
FIG. 7 is a flow-diagram of a method 700, according to an example implementation of the disclosed technology.

FIG. 7 is a flowchart of a method 700 of compensating differential pressure measurement error in a pressure transducer due to absolute pressure, according to certain example implementations of the disclosed technology. In block 702, the method 700 includes providing a pressure transducer, the pressure transducer comprising an absolute pressure sensor assembly, a differential pressure sensor assembly, and a compensation circuit in communication with the absolute pressure sensor assembly and the differential pressure sensor assembly. In block 704, the method 700 includes receiving, with the absolute pressure sensor assembly and the differential pressure assembly via a main pressure port, an absolute pressure. In block 706, the method 700 includes receiving, with the differential pressure sensor assembly via a reference pressure port, a reference pressure. In block 708, the method 700 includes outputting, with the compensation circuit, a compensated signal, the compensated signal comprising an output of the differential pressure sensor assembly modified by at least a portion of an output of the absolute pressure sensor assembly.

According to an example implementation of the disclosed technology, the method can include attenuating an output of the absolute pressure sensor assembly to produce a scaled output that may be utilized to reduce an error.

Certain example implementations of the disclosed technology can include attenuating the output of the absolute pressure sensor assembly and subtracting the attenuated output of the absolute pressure sensor assembly from the output of the differential pressure sensor assembly to reduce measurement error due to absolute pressure. In certain example implementations, the measurement error reduced may include offset error. In certain example implementations, the measurement error reduced may include slope error.

Certain example implementations of the disclosed technology can include providing a controller and an electronically controllable attenuator connected to an output of the absolute pressure sensor assembly. In certain example implementations, the controller may be configured to adjust the electronically controllable attenuator based on a measured output of the absolute pressure sensor assembly.

In certain example implementations, the attenuating can include configuring one or more resistive elements to reduce an offset in the compensated signal while equal pressure is applied to the main pressure port and the reference pressure port.

In certain example implementations, providing the compensation circuit of the pressure transducer can include providing at least one attenuator connected to an output of one or more of the differential pressure sensor assembly and the absolute pressure sensor assembly. In certain example implementations, providing the compensation circuit of the pressure transducer can include providing one or more adder circuits. In certain example implementations, providing the one or more adder circuits can include providing one or more of a differential amplifier and a summing amplifier.

In certain example implementations, providing the compensation circuit of the pressure transducer can include providing a first attenuator and connecting the first attenuator to an output of the differential pressure sensor assembly. In certain example implementations, providing the compensation circuit of the pressure transducer can include providing a second attenuator and connecting the second attenuator to an output of the absolute pressure sensor assembly. In certain example implementations, providing the compensation circuit of the pressure transducer can include connecting outputs of the first and second attenuators in parallel with an output of the pressure transducer.

According to certain example implementations of the disclosed technology, a dual sensor transducer may be provided that includes an absolute pressure sensor assembly, a differential pressure sensor assembly, a main pressure port in communication with a first side of the absolute pressure sensor assembly and a first side of the differential pressure sensor assembly, a reference pressure port in communication with a second side of the differential pressure sensor assembly, and a compensation circuit in communication with the absolute pressure sensor assembly and the differential pressure sensor assembly. The compensation circuit may be configured to reduce an error in an output of the differential pressure sensor assembly by at least a portion of an output of the absolute pressure sensor assembly.

In certain example implementations, the dual sensor transducer may include a rigid support structure. In certain example implementations, the absolute pressure sensor assembly may be mounted on a first portion of the rigid support structure. In certain example implementations, the differential pressure assembly may be mounted on a second portion of the rigid support structure.

In accordance with certain example implementations of the disclosed technology, the dual sensor pressure transducer can include a first support structure and a second support structure. In certain example implementations, the absolute pressure sensor assembly may be mounted on the first support structure and the differential pressure assembly may be mounted on the second support structure.

In certain example implementations, the absolute pressure sensor assembly of the dual sensor pressure transducer can include a first Wheatstone bridge. In certain example implementations, the differential pressure sensor assembly of the dual sensor pressure transducer can include a second Wheatstone bridge.

In certain example implementations, the absolute pressure sensor assembly can include a first diaphragm, wherein the first Wheatstone bridge is mounted on the first diaphragm. In certain example implementations, the differential pressure sensor assembly can include a second diaphragm, wherein the second Wheatstone bridge is mounted on the second diaphragm.

In accordance with certain example implementations of the disclosed technology, the first Wheatstone bridge and the second Wheatstone bridge each comprise four piezoresistive sensing elements.

In accordance with certain example implementations of the disclosed technology, the compensation circuit can include a first attenuator connected to an output of the differential pressure sensor assembly. In certain example implementations, the compensation circuit can include a second attenuator connected to an output of the absolute pressure sensor assembly. In certain example implementations, one or more of the first and second attenuators may be connected in parallel with an output of the dual sensor pressure transducer.

In certain example implementations, one or more of the first and second attenuators may include variable resistors. In certain example implementations, one or more of the first and second attenuators may include fixed resistors.

In certain example implementations, the first attenuator can include a first resistor connected to a first output of the differential pressure sensor assembly; and a second resistor connected to a second output of the differential pressure sensor assembly. In certain example implementations, the second attenuator can include a third resistor connected to a first output of the absolute pressure sensor assembly; and a fourth resistor connected to a first output of the absolute pressure sensor assembly. In certain example implementations, one or more of the first, second, third, and fourth resistors are fixed resistors. In certain example implementations, one or more of the first, second, third, and fourth resistors are variable resistors (or potentiometers).

In accordance with certain example implementations of the disclosed technology, the compensation circuit can include one or more adder circuits in communication with the at least one attenuator and one or more of the output of the differential pressure sensor assembly and an output of the absolute pressure sensor assembly. In certain example implementations, the one or more adder circuits comprise a differential amplifier. In certain example implementations, one or more adder circuits comprise a summing amplifier.

Certain example implementations of the compensation circuit can include one or more electronically controllable attenuators. For example, an electronically controllable attenuator may be connected to an output of the absolute pressure sensor assembly. In certain example implementations, the compensation circuit can include a controller configured to adjust the electronically controllable attenuator based on a measured output of the absolute pressure sensor assembly. In this example implementation, the output of the electronically controllable attenuator (corresponding to an attenuated portion of the output of the absolute pressure sensor assembly) may be combined/added/subtracted from an output of the differential sensor (via an adder, for example) to automatically adjust for errors in an output of the differential sensor due to the presence of absolute pressure. In certain example implementations, the automatic adjustment may reduce errors in the output of the dual sensor pressure transducer (due to the presence of absolute pressure) over a wide range of values of absolute pressure.

According to certain example implementations of the disclosed technology, the compensation system and methods may be implemented in many ways. In some implementations, active circuits may be utilized for attenuators, adders and/or amplifiers. In some implementations, the compensation may be implemented for unamplified transducers utilizing passive circuits.

Numerous characteristics and advantages have been set forth in the foregoing description, together with details of structure and function. While the disclosed technology has been disclosed in several forms, it will be apparent to those skilled in the art that many modifications, additions, and deletions, especially in matters of shape, size, and arrangement of parts, can be made therein without departing from the spirit and scope of the disclosed technology and its equivalents as set forth in the following claims. Therefore, other modifications or embodiments as may be suggested by the teachings herein are particularly reserved as they fall within the breadth and scope of the claims here appended.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Although preferred embodiments of the disclosed technology are explained in detail, it is to be understood that other embodiments are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways.

Throughout the specification and the claims, the following terms take at least the meanings explicitly associated herein, unless the context clearly dictates otherwise. The terms "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "includes," and its various forms are intended to mean including but not limited to. A device or structure that is "configured" in a certain way is configured in at least that way but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. Also, in describing the preferred embodiments, certain terminology has been used for the sake of clarity. It is intended that each term contemplates its broadest meaning as understood by those skilled in the art and includes all technical equivalents which operate in a similar manner to accomplish a similar purpose.

Although this disclosure describes specific examples, embodiments, and the like, certain modifications and changes may be made without departing from the scope of the disclosed technology, as set forth in the claims below. For example, although the example methods, devices, and systems, described herein are in conjunction with a pressure transducer or a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

What is claimed is:

1. A pressure transducer, comprising:
   an absolute pressure sensor assembly;
   a differential pressure sensor assembly;
   a main pressure port in communication with a first input of the absolute pressure sensor assembly and a first input of the differential pressure sensor assembly;
   a reference pressure port in communication with a second input of the differential pressure sensor assembly; and
   a compensation circuit in communication with the absolute pressure sensor assembly and the differential pressure sensor assembly, the compensation circuit comprising:
      an electronically controllable attenuator connected to an output of the absolute pressure sensor assembly; and
      a controller configured to adjust the electronically controllable attenuator based on a measured output of the absolute pressure sensor assembly;

wherein the compensation circuit is configured to reduce an error in an output of the differential pressure sensor assembly based on the measured output of the absolute pressure sensor assembly.

2. The pressure transducer of claim 1, further comprising a rigid support structure, wherein the absolute pressure sensor assembly is mounted on a first portion of the rigid support structure and wherein the differential pressure assembly is mounted on a second portion of the rigid support structure.

3. The pressure transducer of claim 1, further comprising:
a first support structure; and
a second support structure;
wherein the absolute pressure sensor assembly is mounted on the first support structure and wherein the differential pressure assembly is mounted on the second support structure.

4. The pressure transducer of claim 1, wherein the absolute pressure sensor assembly comprises a first Wheatstone bridge and wherein the differential pressure sensor assembly comprises a second Wheatstone bridge.

5. The pressure transducer of claim 4, wherein the absolute pressure sensor assembly comprises a first diaphragm, wherein the first Wheatstone bridge is mounted on the first diaphragm; and wherein the differential pressure sensor assembly comprises a second diaphragm, wherein the second Wheatstone bridge is mounted on the second diaphragm.

6. The pressure transducer of claim 1, wherein the compensation circuit comprises:
a second attenuator connected to the output of the differential pressure sensor assembly;
wherein the electronically controllable attenuator and second attenuator are connected in parallel with an output of the pressure transducer.

7. The pressure transducer of claim 6, wherein one or more of the electronically controllable attenuator and the second attenuator comprise variable resistors.

8. The pressure transducer of claim 6, wherein the second attenuator comprises:
a first resistor connected to the output of the differential pressure sensor assembly; and
a second resistor connected to the output of the differential pressure sensor assembly; and wherein the electronically controllable attenuator comprises:
a third resistor connected to the output of the absolute pressure sensor assembly; and
a fourth resistor connected to the output of the absolute pressure sensor assembly.

9. The pressure transducer of claim 8, wherein one or more of the first and second resistors are fixed resistors.

10. The pressure transducer of claim 1, wherein the error is due at least in part to an absolute pressure applied to the pressure transducer.

11. The pressure transducer of claim 1, wherein the compensation circuit comprises a second attenuator connected to the output of the differential pressure sensor assembly, the compensation circuit further comprising one or more adder circuits in communication with one or more of the electronically controllable and second attenuators and one or more of the output of the differential pressure sensor assembly and the output of the absolute pressure sensor assembly.

12. The pressure transducer of claim 11, wherein the one or more adder circuits comprise one or more of a differential amplifier and a summing amplifier.

13. The pressure transducer of claim 1, wherein the controller comprises a programmable gain amplifier.

14. A method of compensating differential pressure measurement error in a pressure transducer due to absolute pressure, the method comprising:
providing a pressure transducer, the pressure transducer comprising
an absolute pressure sensor assembly;
a differential pressure sensor assembly; and
a compensation circuit in communication with the absolute pressure sensor assembly and the differential pressure sensor assembly, the compensation circuit comprising:
an electronically controllable attenuator connected to an output of the absolute pressure sensor assembly; and
a controller configured to adjust the electronically controllable attenuator based on a measured output of the absolute pressure sensor assembly;
receiving, with the absolute pressure sensor assembly and the differential pressure assembly via a main pressure port, an absolute pressure;
receiving, with the differential pressure sensor assembly via a reference pressure port, a reference pressure; and
outputting, with the compensation circuit, a compensated signal, the compensated signal comprising an output of the differential pressure sensor assembly modified by at least a portion of the output of the absolute pressure sensor assembly.

15. The method of claim 14, further comprising attenuating the output of the absolute pressure sensor assembly with the electronically controllable attenuator and subtracting the attenuated output of the absolute pressure sensor assembly from the output of the differential pressure sensor assembly to reduce error due to absolute pressure.

16. The method of claim 15, wherein the attenuating comprises configuring one or more resistive elements to reduce an offset in the compensated signal while equal pressure is applied to the main pressure port and the reference pressure port.

17. The method of claim 14, wherein providing the compensation circuit of the pressure transducer comprises:
providing one or more adder circuits, the one or more adder circuits comprising one or more of a differential amplifier and a summing amplifier.

18. The method of claim 14, wherein providing the compensation circuit of the pressure transducer comprises:
providing a second attenuator and connecting the second attenuator to the output of the differential pressure sensor assembly; and
connecting outputs of the electronically controllable attenuator and the second attenuator in parallel with an output of the pressure transducer.

* * * * *